United States Patent
Karri et al.

(10) Patent No.: US 12,367,821 B2
(45) Date of Patent: Jul. 22, 2025

(54) EXPEDITING FINGERPRINT AUTHENTICATION VIA VARIABLE REFRESH RATE CONTROL AND DISPLAY LUMINANCE COMPENSATION

(71) Applicant: Google LLC, Mountain View, CA (US)

(72) Inventors: Jyothi Karri, San Jose, CA (US); Chien-Hui Wen, Cupertino, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/494,398

(22) Filed: Oct. 25, 2023

(65) Prior Publication Data

US 2024/0062718 A1    Feb. 22, 2024

Related U.S. Application Data

(60) Provisional application No. 63/381,498, filed on Oct. 28, 2022.

(51) Int. Cl.
*G06F 3/041* (2006.01)
*G06V 40/12* (2022.01)
(Continued)

(52) U.S. Cl.
CPC .......... *G09G 3/3225* (2013.01); *G06F 3/041* (2013.01); *G06V 40/1318* (2022.01);
(Continued)

(58) Field of Classification Search
None
See application file for complete search history.

(56) References Cited

U.S. PATENT DOCUMENTS 9,697,758 B2   7/2017   Watanabe et al.
10,021,226 B2  7/2018   Gagne-Keats et al.
(Continued)

FOREIGN PATENT DOCUMENTS

CN   103488364 A   1/2014
CN   110310596 A   10/2019
(Continued)

OTHER PUBLICATIONS

"Foreign Office Action", IN Application No. 202247031876, Aug. 7, 2023, 7 pages.
(Continued)

*Primary Examiner* — Brian M Butcher
(74) *Attorney, Agent, or Firm* — Colby Nipper PLLC

(57) ABSTRACT

This document describes systems and techniques directed at expediting fingerprint authentication via variable refresh rate control and display luminance compensation. In aspects, a computing device having an under-display fingerprint sensor (UDFPS) and a touch-sensitive display includes a biometric authentication manager. Upon detecting at least one finger at or near the touch-sensitive display, the biometric authentication manager implements variable display refresh rates and selectively adjusts luminance settings for a high-luminance region of the touch-sensitive display for predetermined intervals. In so doing, at least one finger can be well-illuminated during UDFPS image capturing, facilitating UDFPS sensing and expediting fingerprint authentication.

11 Claims, 9 Drawing Sheets

(51) Int. Cl.
  *G06V 40/13*     (2022.01)
  *G09G 3/3225*    (2016.01)

(52) U.S. Cl.
  CPC .. *G06V 40/1365* (2022.01); *G09G 2320/0626* (2013.01); *G09G 2340/0435* (2013.01); *G09G 2354/00* (2013.01)

(56) References Cited

U.S. PATENT DOCUMENTS

| | | |
|---|---|---|
| 10,068,551 B1 | 9/2018 | Choi et al. |
| 10,440,839 B2 | 10/2019 | Cheng |
| 10,510,317 B2 | 12/2019 | Spence et al. |
| 10,742,788 B2 | 8/2020 | Shin et al. |
| 10,838,452 B2 | 11/2020 | Siddiqui et al. |
| 10,890,954 B2 | 1/2021 | Evans et al. |
| 10,997,914 B1 | 5/2021 | Hwang et al. |
| 11,163,970 B1 | 11/2021 | Sammoura et al. |
| 11,403,984 B2 | 8/2022 | Jung et al. |
| 12,008,836 B2 | 6/2024 | Kim et al. |
| 2006/0093928 A1 | 5/2006 | Hung et al. |
| 2007/0070272 A1 | 3/2007 | Gettemy et al. |
| 2008/0062102 A1 | 3/2008 | Ichiraku et al. |
| 2008/0123032 A1 | 5/2008 | Taniguchi et al. |
| 2010/0053853 A1 | 3/2010 | Allore et al. |
| 2011/0175852 A1 | 7/2011 | Goertz et al. |
| 2013/0088671 A1 | 4/2013 | Drzaic et al. |
| 2013/0135272 A1 | 5/2013 | Park |
| 2013/0342519 A1 | 12/2013 | Kim et al. |
| 2014/0118985 A1 | 5/2014 | Hassember |
| 2014/0240911 A1 | 8/2014 | Cole et al. |
| 2014/0265822 A1 | 9/2014 | Drzaic et al. |
| 2014/0267370 A1 | 9/2014 | Albrecht et al. |
| 2014/0267448 A1 | 9/2014 | Albrecht et al. |
| 2015/0070826 A1 | 3/2015 | Montevirgen et al. |
| 2015/0138434 A1 | 5/2015 | Chuang et al. |
| 2015/0287352 A1 | 10/2015 | Watanabe et al. |
| 2015/0301417 A1 | 10/2015 | Park et al. |
| 2015/0331292 A1 | 11/2015 | Yang et al. |
| 2016/0063933 A1 | 3/2016 | Kobayashi et al. |
| 2016/0078838 A1 | 3/2016 | Huang et al. |
| 2016/0078846 A1 | 3/2016 | Liu et al. |
| 2016/0227654 A1 | 8/2016 | Kim et al. |
| 2016/0337570 A1 | 11/2016 | Tan et al. |
| 2017/0092196 A1 | 3/2017 | Gupta et al. |
| 2017/0116932 A1 | 4/2017 | Musgrave et al. |
| 2017/0168463 A1 | 6/2017 | Hong et al. |
| 2017/0200054 A1 | 7/2017 | Du et al. |
| 2017/0322357 A1 | 11/2017 | De Jong et al. |
| 2018/0012006 A1 | 1/2018 | Suh et al. |
| 2018/0018501 A1 | 1/2018 | Mather et al. |
| 2018/0040301 A1 | 2/2018 | Bae et al. |
| 2018/0075798 A1 | 3/2018 | Nho et al. |
| 2018/0137332 A1 | 5/2018 | Andersen et al. |
| 2018/0151109 A1 | 5/2018 | Shim et al. |
| 2018/0165508 A1 | 6/2018 | Othman et al. |
| 2018/0260602 A1 | 9/2018 | He et al. |
| 2018/0285619 A1 | 10/2018 | Kim et al. |
| 2018/0300526 A1 | 10/2018 | Cho et al. |
| 2018/0301080 A1 | 10/2018 | Shigeta et al. |
| 2018/0350313 A1 | 12/2018 | Nambi et al. |
| 2019/0057660 A1* | 2/2019 | Lee ................ G06F 1/1637 |
| 2019/0197944 A1 | 6/2019 | Kim et al. |
| 2019/0228740 A1 | 7/2019 | Aflatooni et al. |
| 2019/0303639 A1 | 10/2019 | He et al. |
| 2019/0303642 A1 | 10/2019 | He et al. |
| 2020/0035202 A1 | 1/2020 | Aflatooni et al. |
| 2020/0050818 A1 | 2/2020 | He et al. |
| 2020/0117933 A1 | 4/2020 | Chang et al. |
| 2020/0273427 A1 | 8/2020 | Wang |
| 2020/0327348 A1 | 10/2020 | Kim |
| 2020/0403186 A1 | 12/2020 | Choi et al. |
| 2021/0005158 A1 | 1/2021 | Huang et al. |
| 2021/0056281 A1 | 2/2021 | Shih et al. |
| 2021/0201731 A1 | 7/2021 | Ranjan et al. |
| 2021/0209327 A1 | 7/2021 | Wu et al. |
| 2021/0232791 A1 | 7/2021 | Wang |
| 2021/0248350 A1 | 8/2021 | Chang et al. |
| 2021/0264181 A1 | 8/2021 | Park et al. |
| 2021/0271851 A1 | 9/2021 | Chou et al. |
| 2021/0333928 A1 | 10/2021 | Wu et al. |
| 2021/0335325 A1 | 10/2021 | Her et al. |
| 2021/0408140 A1 | 12/2021 | Han et al. |
| 2022/0043488 A1 | 2/2022 | Lombardi et al. |
| 2022/0050506 A1 | 2/2022 | Gehlen et al. |
| 2022/0058254 A1 | 2/2022 | Park et al. |
| 2022/0130308 A1 | 4/2022 | Jung et al. |
| 2022/0148536 A1 | 5/2022 | Choi |
| 2022/0165083 A1 | 5/2022 | Lin et al. |
| 2022/0270550 A1 | 8/2022 | Choi et al. |
| 2022/0391086 A1 | 12/2022 | Westerman |
| 2023/0154411 A1* | 5/2023 | Lee ................ G06V 40/1306 345/204 |
| 2023/0222950 A1 | 7/2023 | Zhang |
| 2023/0274573 A1 | 8/2023 | Kim et al. |
| 2023/0274678 A1 | 8/2023 | Wen et al. |
| 2023/0306912 A1 | 9/2023 | Wen et al. |
| 2023/0343267 A1 | 10/2023 | Wen |
| 2024/0029684 A1 | 1/2024 | Sun et al. |
| 2024/0105142 A1 | 3/2024 | Jeon et al. |
| 2024/0161548 A1 | 5/2024 | Kim et al. |
| 2024/0193985 A1 | 6/2024 | Sammoura et al. |
| 2024/0264740 A1 | 8/2024 | Zou et al. |
| 2024/0298509 A1 | 9/2024 | Gong et al. |

FOREIGN PATENT DOCUMENTS

| | | |
|---|---|---|
| CN | 111241890 | 6/2020 |
| CN | 111477135 | 7/2020 |
| CN | 112288661 A | 1/2021 |
| CN | 112331145 | 2/2021 |
| CN | 113053306 | 6/2021 |
| CN | 114187867 | 3/2022 |
| CN | 115035851 A | 9/2022 |
| CN | 117351895 A | 1/2024 |
| KR | 20160080768 | 7/2016 |
| KR | 102279278 | 7/2021 |
| TW | 202318385 A | 5/2023 |
| TW | 202404343 A | 1/2024 |
| WO | 2015188595 A1 | 12/2015 |
| WO | 2020192051 A1 | 10/2020 |
| WO | 2022046025 | 3/2022 |
| WO | 2022105484 | 5/2022 |

OTHER PUBLICATIONS

"Foreign Office Action", JP Application No. 2022-536640, Sep. 5, 2023, 4 pages.
"International Preliminary Report on Patentability", Application No. PCT/US2020/047670, Feb. 28, 2023, 10 pages.
"International Search Report and Written Opinion", Application No. PCT/US2022/072601, Jan. 16, 2023, 12 pages.
"International Search Report and Written Opinion", Application No. PCT/US2020/047670, May 12, 2021, 13 pages.
"Non-Final Office Action", U.S. Appl. No. 17/507,293, filed Feb. 17, 2023, 7 pages.
"Non-Final Office Action", U.S. Appl. No. 17/586,386, filed Oct. 24, 2022, 5 pages.
Choi, et al., "Disabling Transitions When Encoded Intensity is Low", Application No. PCT/US2021/070522, filed May 10, 2021, 46 pages.
Choi, et al., "Light-Guiding Structure For Under-Display Sensor Modules", Technical Disclosure Commons; https://www.tdcommons.org/dpubs_series/3527, Aug. 17, 2020, 8 pages.
Chugh, et al., "Fingerprint Spoof Detection: Temporal Analysis of Image Sequence", Dec. 17, 2019, 8 pages.
Ghiani, et al., "Fingerprint liveness detection using Binarized Statistical Image Features", Oct. 2013, 6 pages.
Karri, et al., "User Interface Mitigation of Display Artifacts During Transitions between Display Clock Speeds", Technical Disclosure Commons, https://www.tdcommons.org/dpubs_series/5427, Nov. 4, 2022, 7 pages.

(56) References Cited

OTHER PUBLICATIONS

Li-Fong, et al., "A Circular Flexible Amoled Display with a 1-mm Slim Border", May 25, 2016, pp. 847-850.
Lih, et al., "A True Circular 1.39 Inch Amoled for Wearable Application", May 2016, pp. 566-569.
Lombardi, et al., "Adaptive User Interface for a Camera Aperture within an Active Display Area", Technical Disclosure Commons; Retrieved from https://www.tdcommons.org/dpubs_series/2719, Nov. 25, 2019, 12 pages.
Ojala, et al., "Multiresolution Gray-Scale and Rotation Invariant Texture Classification with Local Binary Patterns", Jul. 2002, pp. 971-987.
Sammoura, et al., "Fingerprint-Matching Algorithm Using Polar Shapelets", Technical Disclosure Commons; Retrieved from https://www.tdcommons.org/dpubs_series/2471, Sep. 10, 2019, 17 pages.
Sammoura, et al., "Safeguarding Biometric Authentication Systems from Fingerprint Spoof Attacks", Technical Disclosure Commons; Retrieved from https://www.tdcommons.org/dpubs_series/2769, Dec. 16, 2019, 13 pages.
Sammoura, et al., "Spoof Detection for Fingerprint Sensors", Technical Disclosure Commons; Retrieved from https://www.tdcommons.org/dpubs_series/2648, Nov. 5, 2019, 12 pages.
Shin, et al., "Dynamic Voltage Scaling of OLED Displays", Jun. 2011, 6 pages.
Skanda, Sai, "Xiaomi Mi 9 to Feature an Improved In-screen Fingerprint Sensor", https://www.gizchina.com/2019/02/17/mi-9-fingerprint-improved-fingerprint/, Feb. 17, 2019, 10 pages.
Yonebayashi, et al., "High refresh rate and low power consumption AMOLED panel using top-gate n-oxide and p-LTPS TFTs", Mar. 2020, 10 pages.
Choi, et al., "Expediting Fingerprint Authentication by Compensating for Display Luminance Latency", Technical Disclosure Commons, https://www.tdcommons.org/dpubs_series/4686, Oct. 29, 2021, 11 pages.
Wen, et al., "Improving Under-Display Fingerprint Authentication Latency by Normalizing Frame Luminance", Technical Disclosure Commons—https://www.tdcommons.org/dpubs_series/5006, Mar. 24, 2022, 12 pages.
"Notice of Allowance", U.S. Appl. No. 18/313,138, filed Mar. 12, 2024, 7 pages.
Lee, et al., "Illumination-Level Adaptive Color Reproduction Method with Lightness Adaptation and Flare Compensation for Mobile Display", Jan. 2007, 9 pages.
Li, et al., "Advanced Prediction Model for Variable Refresh Rate Compensation Compensation", May 29, 2024, 9 pages.
Li, et al., "Smart Mathematical Model for Variable Refresh Rate Prediction Algorithm", Technical Disclosure Commons, https://www.tdcommons.org/dpubs_series/7047, May 29, 2024, 10 pages.
Bai, et al., "On-Pixel Ratio-Based Adjustment of Local High Brightness Control", Oct. 8, 2024, 13 pages.
Eltoft, et al., "Adaptive Maximum Fingerprint Touch-Size Threshold for Reduced Unintended Authentication Attempts and Reduced Spoof Accept Rate", Technical Disclosure Commons, https://www.tdcommons.org/dpubs_series/7586, Nov. 22, 2024, 12 pages.
"DAC <Basic D/A Converter Configurations>", ROHM—retrieved at: https://www.rohm.com/electronics-basics/ad-da-converters/da-converter-configurations—on Jun. 6, 2024, 9 pages.
Choi, et al., "Independently Controllable Black Level Voltage in Digital-to-Analog Converter Circuits for AMOLED Driving Circuits", Technical Disclosure Commons, https://www.tdcommons.org/dpubs_series/7114, Jun. 18, 2024, 13 pages.
Mienko, et al., ""Ultra-dark" OLED Panel Combining Polarization and Masking Layers", Technical Disclosure Commons, https://www.tdcommons.org/dpubs_series/7923, Mar. 18, 2025, 12 pages.

* cited by examiner

EXPEDITING FINGERPRINT AUTHENTICATION VIA VARIABLE REFRESH RATE CONTROL AND DISPLAY LUMINANCE COMPENSATION

PRIORITY CLAIM AND INCORPORATION BY REFERENCE

This application claims priority to U.S. Provisional Application Ser. No. 63/381,498, filed Oct. 28, 2022, the disclosure of which is incorporated by reference in its entirety.

SUMMARY

This document describes systems and techniques directed at expediting fingerprint authentication via variable refresh rate control and display luminance compensation. In aspects, a computing device having an under-display fingerprint sensor (UDFPS) and a touch-sensitive display includes a biometric authentication manager. Upon detecting at least one finger at or near the touch-sensitive display, the biometric authentication manager implements variable display refresh rates and selectively adjusts luminance settings for a high-luminance region of the touch-sensitive display for predetermined intervals. In so doing, at least one finger can be well-illuminated during UDFPS image capturing, facilitating UDFPS sensing and expediting fingerprint authentication.

In aspects, a computing device is disclosed that includes an under-display fingerprint sensor configured to capture one or more images of a finger having a fingerprint. The computing device further includes a display having a pixel array including rows of pixel circuits. Each of the pixel circuits include one or more light-emitting diodes configured to illuminate. The computing device also includes a data-line driver operably coupled to each of the pixel circuits. The data-line driver is configured to selectively supply data-line signals to one or more of the pixel circuits. The data-line signals include voltage data effective to cause one or more pixel circuits to illuminate light at varying luminosities. The computing device additionally includes an emission control-line driver operably coupled to each of the pixel circuits. The emission control-line driver is configured to supply, in an alternating fashion, a low emission-control signal and a high emission-control signal to each of the pixel circuits effective to implement a refresh rate. The computing device further includes a processor configured to detect a finger at or near the display of the computing device and determine, responsive to the detection of the finger, a target luminance of a region of the display and a target frequency at which the emission control-line driver supplies the low emission-control signal and the high emission-control signal. The processor is further configured to direct, based on the determination, (i) the emission control-line driver to adjust the frequency at which the low emission-control signal and the high emission-control signal are supplied at one or more of the pixel circuits to the target frequency and (ii) the data-line driver to adjust the voltage data for one or more pixel circuits within the region of the display. The direction is sufficient to cause an increase in luminosity of the one or more pixel circuits within the region of the display. The processor is further configured to instruct the under-display fingerprint sensor to capture one or more images of the finger. The frequency adjustment of the emission control-line driver and the voltage data adjustment are effective to facilitate fingerprint image capturing.

This Summary is provided to introduce simplified concepts for systems and techniques directed at expediting fingerprint authentication via variable refresh rate control and display luminance compensation, the concepts of which are further described below in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of systems and techniques directed at expediting fingerprint authentication via variable refresh rate control and display luminance compensation are described in this document with reference to the following drawings:

FIG. 1-2 illustrates an example implementation of the biometric authentication manager implementing variable refresh rate control and display luminance compensation in accordance with one or more implementations;

FIG. 1-3 illustrates another example implementation of the biometric authentication manager implementing variable refresh rate control and display luminance compensation in accordance with one or more implementations;

FIG. 2 illustrates an example implementation of example computing devices which are capable of expediting fingerprint authentication via variable refresh rate control and display luminance compensation;

FIG. 3 illustrates a partial top plan view and a partial, cross-sectional view of an example computing device having a UDFPS;

The same numbers are used throughout the Drawings to reference like features and components.

DETAILED DESCRIPTION

Overview

Figure 1:
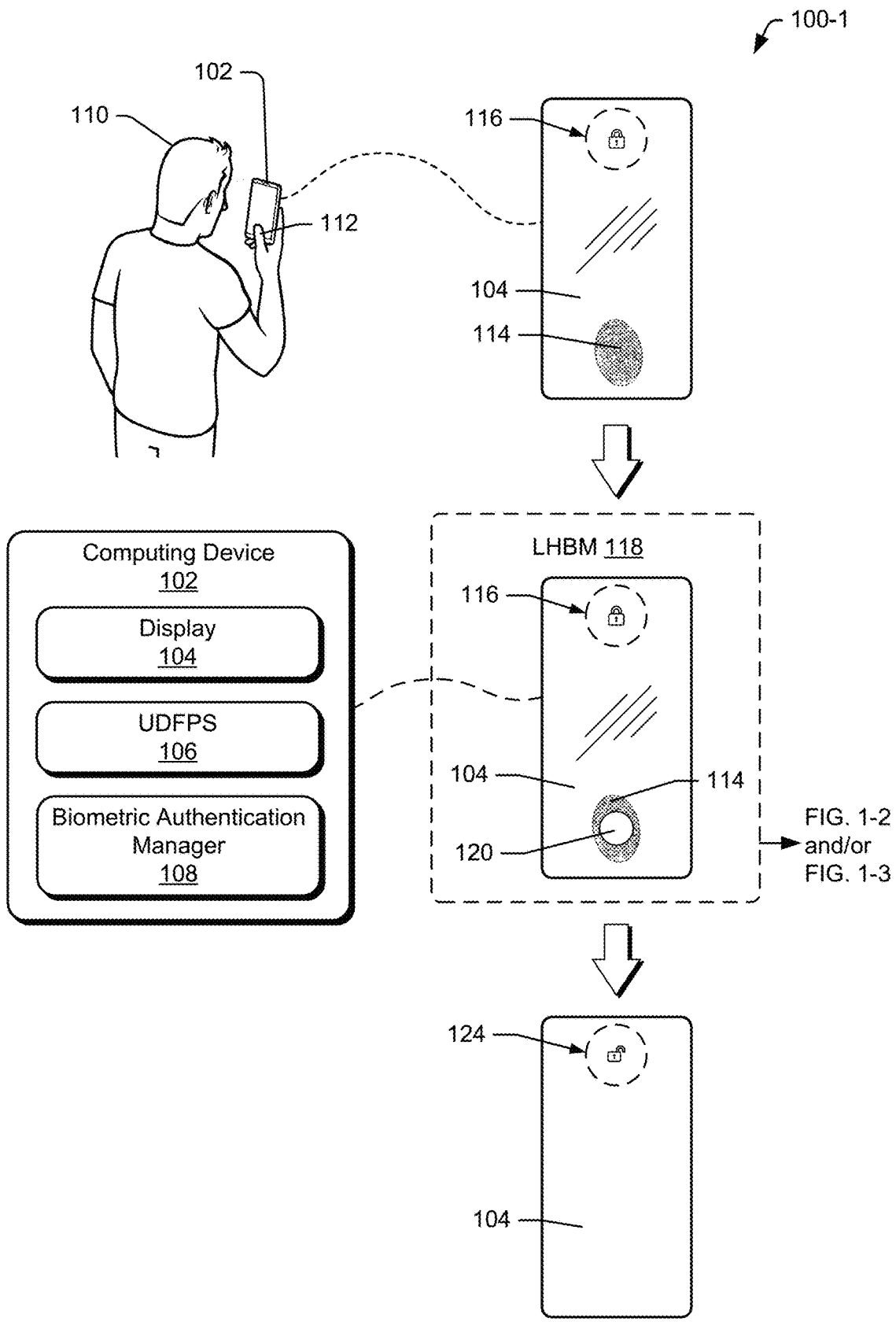
FIG. 1-1 illustrates an example scenario of a computing device expediting fingerprint authentication via variable refresh rate control and display luminance compensation.

Many computing devices (e.g., wireless-network devices, desktops, smartwatches) include an electronic visual display, often simply referred to as a display or screen, integrated as a portion of the computing device's housing. Computing device manufacturers fabricate these displays in a layered structure ("display panel stack"), containing a cover layer (e.g., cover glass) and a display module having a display panel.

Display panels increasingly rely on organic light-emitting diode (OLED) technology, which include tens of thousands of pixel circuits arranged in a two-dimensional array (e.g., circular array, rectangular array). Each pixel circuit may include one or more emitters, which, in isolation or combination, can illuminate to produce colored light ("pixel"). Through activation of the one or more emitters in these pixel circuits, computing devices can cause a display panel to illuminate at various intensities and colors, effective to produce on-screen content (e.g., images). And, by exploiting a feature of the human eye and brain referred to as persistence of vision (e.g., retinal persistence), a display panel can redraw on-screen content at predetermined frequencies ("refresh rate"), giving the illusion of persistent on-screen content. For example, a display panel configured to operate at a 120 hertz (Hz) refresh rate can redraw on-screen content 120 times per second. Moreover, by redrawing on-screen content, the display panel can change on-screen content seamlessly (e.g., scrolling) and give an illusion of on-screen content as images in motion (e.g., video). The benefits of OLED displays include high refresh rates, small display response times, and low power consumption. These benefits make OLED displays well-suited for computing devices, and are further appreciated by users, in large part, because of their image quality.

Further, computing devices with OLED displays can be configured to include one or more under-display biometric recognition systems disposed underneath an OLED display. In more detail, some computing devices are configured having one or more biometric recognition systems disposed underneath, or within, the display panel stack. For example, an under-display fingerprint sensor can be disposed beneath the cover layer and one or more layers (e.g., all layers, one layer) of the display module. Such an implementation allows for a high screen-to-body ratio and, further, preserves space on a display side of a computing device. Users can then provide user input (e.g., a finger having a fingerprint, a fingertip touch input) at a display to authenticate themselves to one or more applications or an operating system implemented on the computing device.

As an example, a UDFPS can capture images of a fingerprint ("verify images") at a predetermined frequency (e.g., frame rate) and a processor of the computing device can then evaluate the verify images to determine authentication. In some implementations, authentication can involve comparing the verify images to one or more enrolled images (e.g., images of a fingerprint of a previously authenticated user) and/or a comparison of biometric identifiers. If the authentication is successful, then the user can gain access to a plurality of resources offered by one or more applications or an operating system of the computing device. Users authenticating themselves to a computing device using at least one biometric identifier, such as fingerprints, is referred to herein as biometric authentication.

Electronic devices configured to perform biometric authentication using a UDFPS may utilize pixels within one or more regions of the OLED display to illuminate user input (e.g., a finger). Due to a low transmissibility of light from an external environment through the display panel to the UDFPS, capturing well-illuminated user input can be difficult. For example, a display may have a visible light transmission (VLT) (e.g., the measurement of light transmission through a given medium) of less than 5%, resulting in sub-optimal image capturing of the user input on the part of the UDFPS. To facilitate image capturing, computing devices may implement a localized high-luminance region in one or more regions of a display panel to better illuminate user input. Generally, this technique of localized high-luminance for biometric authentication at displays of computing devices is referred to as local high-brightness mode (LHBM).

The luminosity of the high-luminance region, expressed in candela per square meter ("nit"), may be hundreds to thousands of nits greater in luminosity than other portions of the display panel ("background region") during biometric authentication. For example, a computing device can implement a high-luminance region having a luminosity of 1300 or more nits and a background region (e.g., a non-high-luminance region) having a luminosity of 200 nits. Through such techniques, the computing device may facilitate UDFPS sensing of reflected light from user input.

Display manufacturers often design display panels that implement LHBM in such a way that when a display driver integrated circuit (DDIC) receives an instruction from one or more processors of the computing device to initiate LHBM, the DDIC causes the high-luminance region to increase in luminance to a preset (e.g., hardcoded) luminosity in a fixed location without impacting the optical characteristics of the display outside of this fixed location. For example, the location of the high-luminance region may be spatially-fixed on the display panel, corresponding (e.g., in a z-axis) to a fingerprint sensing region. In another example, the fingerprint sensing region is within a bottom portion of a display and the high-luminance region forms an ellipse and is localized to a fingerprint sensing region. Since the location, shape, and/or luminosity of the high-luminance region may be predefined, one or more processors of the computing device may be limited to simply turning on or off the high-luminance region by initiating LHBM. In at least some implementations, the one or more processors may be incapable of adjusting the preset location or shape of the high-luminance region. As described herein, and for the aforementioned reasons, the localized high-luminance region may be referred to as a spatially-fixed, high-luminance region.

In an example, a user can place one or more fingers on a display of the device directly above the UDFPS. The device display can illuminate the user input such that the UDFPS can capture reflected light and generate frames ("image capturing") at a predetermined frequency (e.g., frame rate). The frames then undergo signal processing before being evaluated by a fingerprint matching algorithm ("matcher"). For example, the matcher may authenticate the user input based on whether information (e.g., minutia) inferred from the frame matches an enrolled frame of a previously authenticated user.

In many cases, if user input is sub-optimally illuminated, user authentication may be delayed (e.g., unintentionally due to the matcher evaluating sub-optimal fingerprint images). For example, in some instances, organic light-emitting diodes in a display may gradually increase to a target luminance (e.g., a step response, a resistor-capacitor (RC) time constant response). This gradual increase in luminosity to a target luminosity may be the result of organic light-emitting diode material rise-time delays, stemming from a hysteresis effect in thin-film transistors (TFTs). As a consequence, user input may be inadequately illuminated during an initial stage of UDFPS image capturing. To prevent the matcher from evaluating sub-optimal fingerprint images, matcher evaluation of the user input may be delayed (e.g., intentionally via software instructions) until receipt of later frames. However, biometric recognition services with slow user authentication speeds are often undesirable to users.

To this end, this document describes systems and techniques directed at expediting fingerprint authentication via variable refresh rate control and display luminance compensation. In aspects, a computing device having a UDFPS and a touch-sensitive display includes a biometric authentication manager. Upon detecting at least one finger at or near the touch-sensitive display, the biometric authentication manager implements variable display refresh rates and selectively adjusts luminance settings for a high-luminance region of the touch-sensitive display for predetermined intervals. In so doing, at least one finger can be well-illuminated during UDFPS image capturing, facilitating UDFPS sensing and expediting fingerprint authentication.

FIG. 1-1 illustrates an example scenario 100-1 of a computing device 102 performing biometric authentication. As illustrated, the computing device 102 includes a display 104 (e.g., a touch-sensitive display), a UDFPS 106, and a biometric authentication manager 108. A user 110 may provide user input (e.g., a finger 112 having a fingerprint 114) at the display 104 of the computing device 102, which is in a locked state 116. In response, the biometric authentication manager 108 may implement a local high-brightness mode 118 (LHBM 118), causing a region 120 ("high-luminance region 102") of the display 104 to increase in brightness. In implementations, the high-luminance region 120 is spatially-fixed. In alternative implementations, the high-luminance region 120 can be positioned anywhere on the display 104 depending on a location of user input. In additional implementations, the high-luminance region 120 may be situated immediately above (e.g., in a z-axis) the UDFPS 106. In still further implementations, the high-luminance region 120 may be positioned underneath user input to illuminate the fingerprint 114. In an example, to gain access to resources on the computing device 102, the user 110 may provide user input at the display 104 by positioning a finger 112 with a fingerprint 114, on a lower portion of the display 104 directly above the UDFPS 106.

Figures 1, 2:
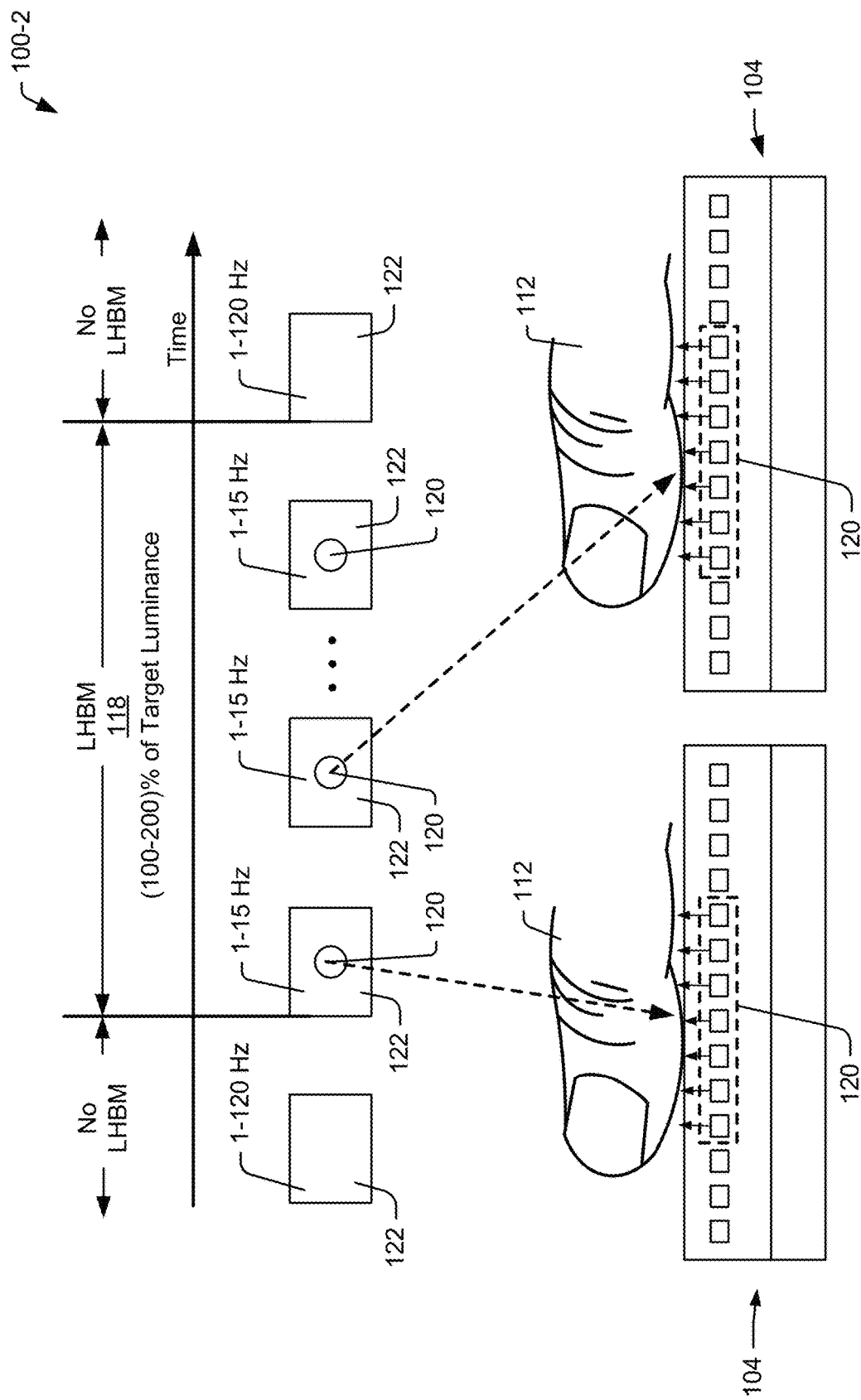

FIG. 1-2 illustrates an example implementation 100-2 of the biometric authentication manager 108 implementing variable refresh rate control and display luminance compensation in accordance with one or more implementations. In implementations, one or more processors (not illustrated) of the computing device 102, executing the biometric authentication manager 108, may instruct a DDIC (not illustrated) to implement the LHBM 118, causing the display 104 to (i) increase a brightness in the high-luminance region 120 and (ii) maintain (or increase) a brightness in a background region 122. To overcome an illumination delay and biometric authentication latency, the biometric authentication manager 108 may set a refresh rate of the display 104 to less than or equal to 15 hertz (Hz) and increase a brightness of the high-luminance region 120 to 100%-200% of a target luminance. In one example, the refresh rate of the display 104 is set to 15 Hz and the brightness of the high-luminance region is set to 1.67 times a target luminance preset (e.g., pre-coded) in a DDIC (or a separate processor) when implementing LHBM 118. In this way, despite an otherwise gradual increase in luminosity to a target luminosity within the high-luminance region 120 during an initial stage of the LHBM 118, the biometric authentication manager 108 aims for a brightness above the target luminance, causing the high-luminance region 120 during the initial stage of the LHBM 118 to achieve, approximately, the target luminance, due to OLED material rise-time delays. In addition, the biometric authentication manager 108 sets the refresh rate frequency to 15 Hz or less and, thereby, causes a constant illumination for a duration greater than or equal to a UDFPS exposure time (e.g., 66.67 milliseconds (ms)). As a result, the high-luminance region 120 provides a consistent and stable illumination at a sufficient luminosity for a UDFPS exposure time.

The UDFPS 106 can then capture (e.g., during the UDFPS exposure time) an image of the finger 112 having the fingerprint 114. Upon capturing the image, the biometric authentication manager 108 can restore a previous refresh rate (or set an altogether new refresh rate) and deactivate LHBM 118. Turning, momentarily, to FIG. 1-1, the biometric authentication manager 108 can also instruct the computing device 102 to enter an unlocked state 124, permitting the user 110 access to one or more resources. Through the above-described techniques, the biometric authentication manager 108 can eliminate intentional (or unintentional) delays that are typically used to wait for sufficient brightness and luminance stabilization in the high-luminance region 120.

Figures 1, 2, 3:
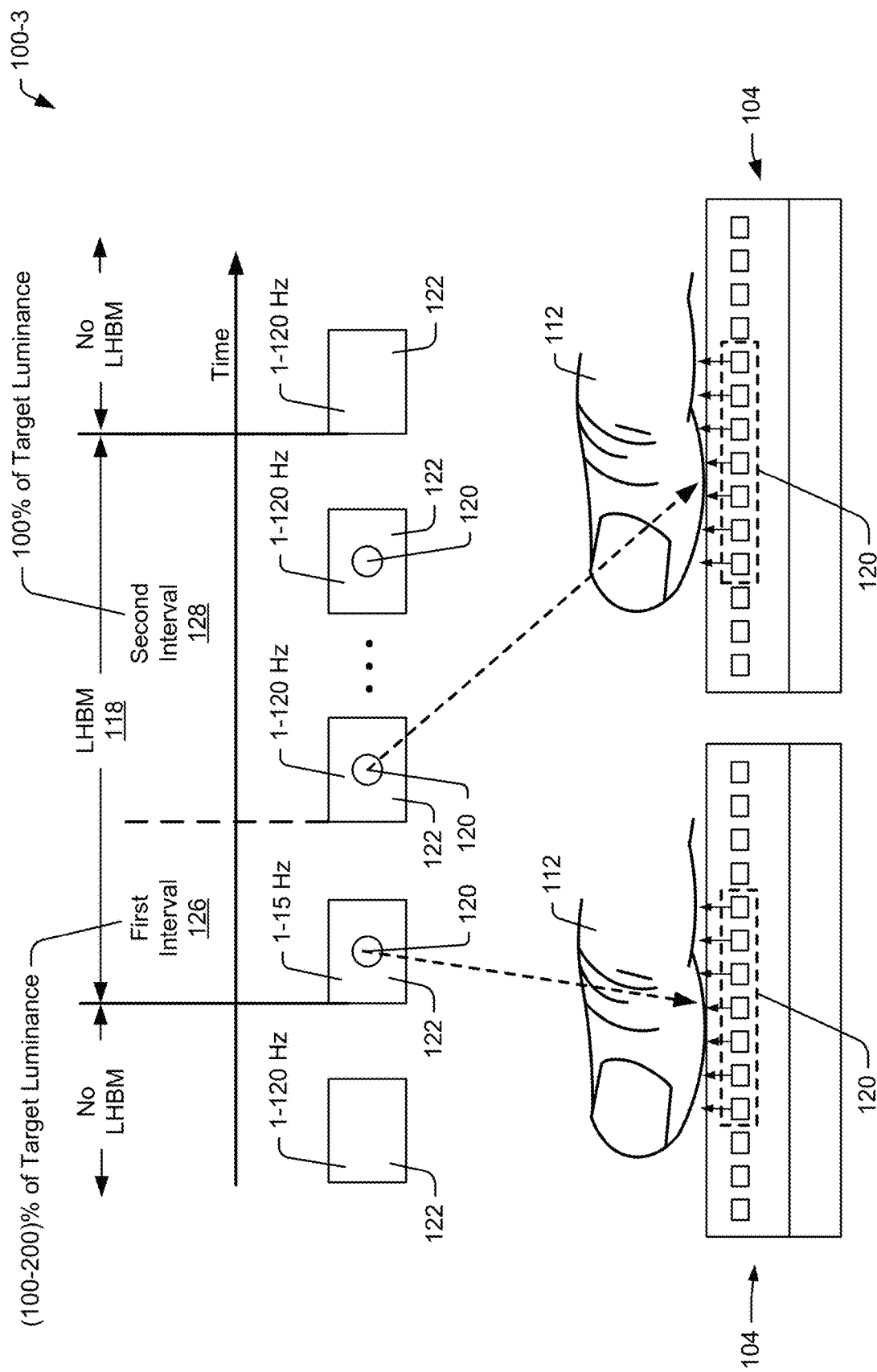
Figure 2:
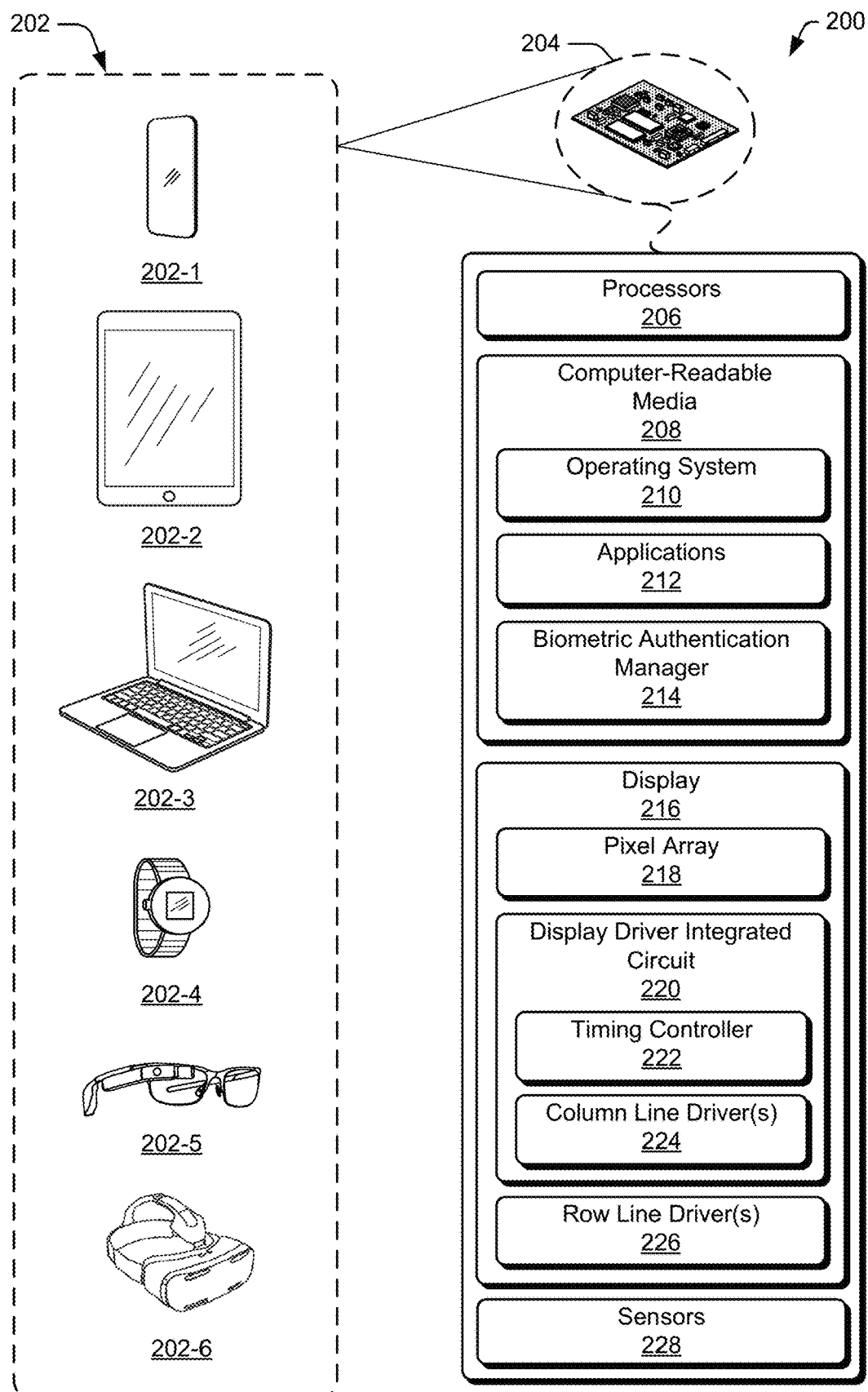
Figure 3:
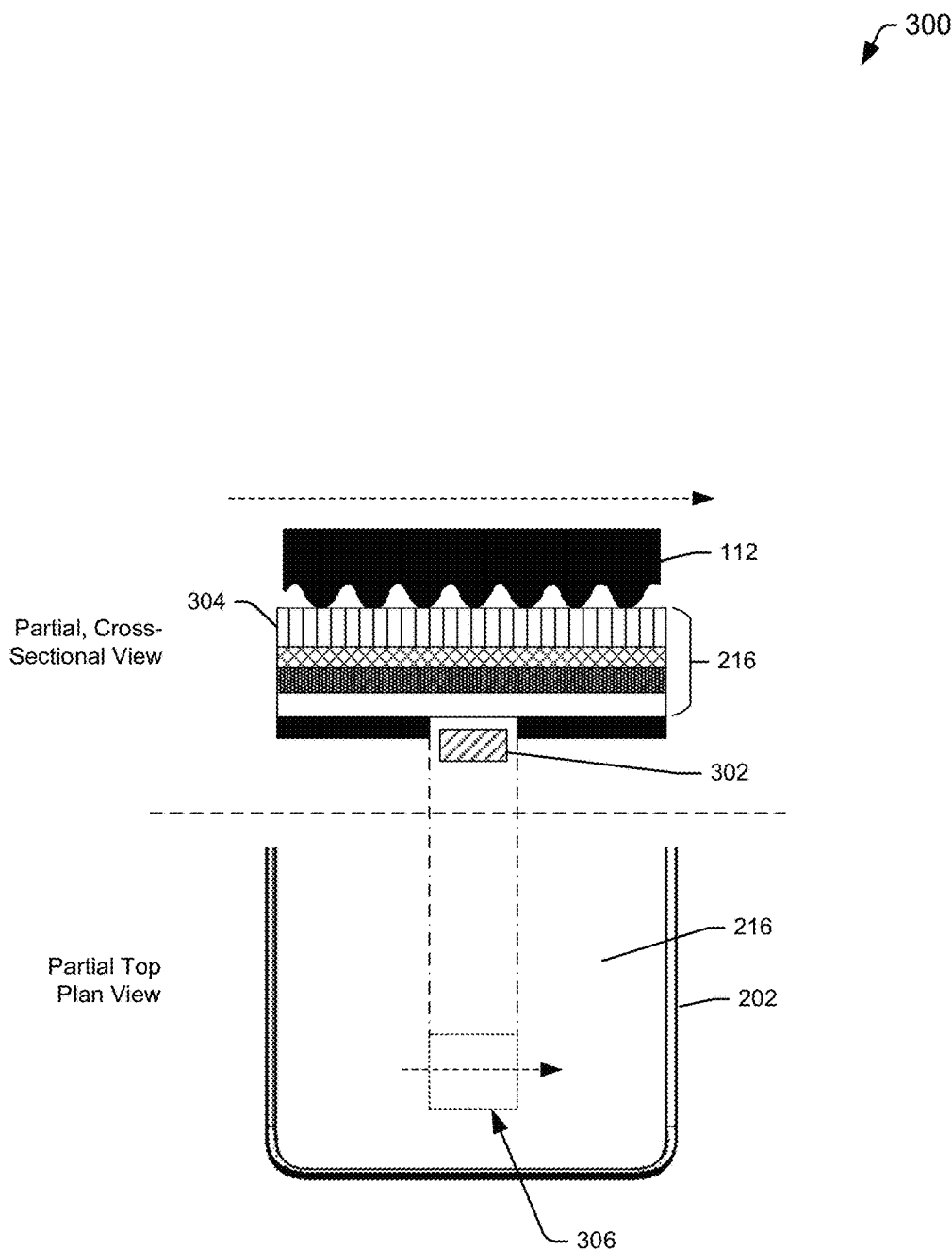

FIG. 1-3 illustrates another example implementation 100-3 of the biometric authentication manager 108 implementing variable refresh rate control and display luminance compensation in accordance with one or more implementations. In implementations, one or more processors (not illustrated) of the computing device 102, executing the biometric authentication manager 108, may instruct the DDIC (not illustrated) to implement the LHBM 118, causing the display 104 to (i) increase a brightness in the high-luminance region 120 and (ii) maintain (or increase) a brightness in a background region 122.

In an event that the biometric authentication manager 108 instructs the UDFPS 106 to capture multiple images of the fingerprint 114 (e.g., because the matcher determines that the first image captured of the fingerprint 114 does not match an authenticated fingerprint), then the biometric authentication manager 108 may implement two intervals (e.g., a first interval 126 and a second interval 128). As illustrated, the first interval 126 of LHBM 118 (which corresponds to the initial stage of LHBM 118, as described above) includes the biometric authentication manager 108 setting a refresh rate of the display 104 to less than or equal to 15 Hz and increasing a brightness of the high-luminance region 120 to 100%-200% of a target luminance.

In the second interval 128 of the LHBM 118, the biometric authentication manager 108 may adjust the refresh rate of the display 104 and lower the brightness of the high-luminance region 120 to the target luminance. For example, responsive to the first interval, the biometric authentication manager 108 adjusts the refresh rate from 15 Hz to 120 Hz and lowers a set brightness of 1.67 times the target luminance to the target luminance (e.g., 100% of the target luminance). The UDFPS 106 can then capture (during the first interval 126 and/or the second interval 128) multiple images of the finger 112 having the fingerprint 114. Upon capturing the images, the biometric authentication manager 108 can restore a previous refresh rate (or set an altogether new refresh rate) and deactivate LHBM 118.

Operating Environment

FIG. 2 illustrates an example implementation 200 of example computing devices 202 which are capable of expediting fingerprint authentication via variable refresh rate control and display luminance compensation. The computing devices 202 are illustrated as a variety of example devices, including consumer computing devices. As non-limiting examples, the computing device 202 can be a mobile phone 202-1 (e.g., computing device 102), a tablet device 202-2, a laptop computer 202-3, a computerized watch 202-4, smart glasses 202-5, virtual-reality (VR)

goggles 202-6, and the like. Note that the computing device 202 can be wearable, non-wearable but mobile, or relatively immobile (e.g., desktops, appliances). The computing device 202 may include additional components and interfaces omitted from FIG. 2 for the sake of clarity.

As illustrated, the computing device 202 includes a printed circuit board assembly 204 (PCBA 204) on which components and interconnects of the computing device 202 may be embodied. In implementations, the PCBA 204 may include multiple printed circuit boards operably coupled together via, for example, electrical wiring. Alternatively or additionally, components of the computing device 202 can be embodied on other substrates, such as flexible circuit material or other insulative material. Generally, electrical components and electromechanical components of the computing device 202 are assembled onto a printed circuit board (PCB) to form the PCBA 204. Various components of the PCBA 204 (e.g., processors and memories) are then programmed and tested to verify the correct function of the PCBA 204. The PCBA 204 is connected to or assembled with other parts of the computing device 202 into a housing.

The PCBA 204 includes one or more processors 206 and computer-readable media 208. The processor(s) 206 may include any suitable single-core or multi-core processor. The processor(s) 206 may be configured to execute instructions or commands stored within computer-readable media 208 including an operating system 210, applications 212, a biometric authentication manager 214, and/or applications (not illustrated). For example, the processor(s) 206 may perform specific computational tasks of the operating system 210 directed at controlling the creation and display of on-screen content on a display. In another example, the processor(s) 206 may execute instructions of the operating system 210 or biometric authentication manager 214 to implement a display refresh rate of 120 Hz. The computer-readable media 208 may include one or more non-transitory storage devices such as a random-access memory (RAM), hard drive, solid-state drive (SSD), or any type of media suitable for storing electronic instructions, each coupled with a computer system bus. The term "coupled" may refer to two or more elements that are in direct contact (physically, electrically, magnetically, optically, etc.) or to two or more elements that are not in direct contact with each other, but still cooperate and/or interact with each other.

The computing device 202 further includes a display 216. The computing device 202 may include any of a variety of display technologies, such as an OLED display. The display 216 includes a pixel array 218 of pixel circuits and a display driver integrated circuit 220 (DDIC 220). The DDIC 220 may include a timing controller 222 and column line driver(s) 224. The column line driver(s) 224 may include, as a non-limiting example, a data-line driver. The display 216 may further include row line driver(s) 226. The row line driver(s) 226 may include, as non-limiting examples, gate-line drivers, scan-line drivers, and/or emission-control drivers.

The timing controller 222 provides interfacing functionality between the processor(s) 206 and the drivers (e.g., column line driver(s) 224, row line driver(s) 226) of the display 216. The timing controller 222 generally accepts commands and data from the processor(s) 206, generates signals with appropriate voltage, current, timing, and demultiplexing, and transmits the signals to the drivers to enable the display 216 to present the desired image.

The drivers may transmit time-variant and amplitude-variant signals (e.g., voltage signals, current signals) to control the pixel array 218. For example, a data-line driver transmits signals containing voltage data to the pixel array 218 to control the luminance of an organic light-emitting diode. A scan-line driver transmits a signal to enable or disable an organic light-emitting diode to receive the data voltage from the data-line driver. An emission-control driver supplies an emission-control signal to the pixel array 218. For example, the emission-control driver can supply, in an alternating fashion, a low emission-control signal and a high emission-control signal to each of the pixel circuits. In implementations, the low emission-control signal is configured to enable an illumination of one or more pixel circuits in accordance with received voltage data and the high emission-control signal configured to disable the illumination of one or more pixel circuits. Together, the drivers control the pixel array 218 to generate light to create an image on the display 216.

The PCBA 204 may further include one or more sensors 228 disposed anywhere on or in the computing device 202. The sensors can include any of a variety of sensors, such as an audio sensor (e.g., a microphone), a touch-input sensor (e.g., a touchscreen), an image-capture device (e.g., a camera, video-camera), proximity sensors (e.g., capacitive sensors), an ambient light sensor (e.g., photodetector), and/or a UDFPS (e.g., UDFPS 106). The UDFPS can be implemented as an optical UDFPS or as an ultrasonic UDFPS. The UDFPS can be disposed within a housing of the computing device 202, embedded underneath the display 216. In implementations, the PCBA 204 can include more than one UDFPS.

FIG. 3 illustrates a partial top plan view and a partial, cross-sectional view an example implementation 300 of an example computing device 202 having a UDFPS 302. In portions of the following discussion, reference may be made to example implementation 200 of FIG. 2 and entities detailed in FIGS. 1-1 and 1-2 for example only. As illustrated in the partial top plan view, at a bottom half of the computing device 202, the UDFPS 302 may be embedded underneath the display 216. The display 216 may be implemented as a display panel stack including a cover layer 304 and a display module. In implementations, the cover layer 304 may be any transparent substrate composed of a variety of materials, including plastic or glass. The display module may include one or more of a polarizer film, a display panel, a metallic layer, optical adhesive (OCA), a polymer layer, and a back cover. In one implementation, the UDFPS 302 is attached (e.g., bonded, laminated) to the underside of the display 216. Although the UDFPS 302 and a corresponding sensing region 306 are illustrated as shaped substantially rectangular, the UDFPS 302 and the corresponding sensing region can form any of a variety of shapes at any number of locations.

During biometric authentication, the biometric authentication manager 214 may instruct processor(s) 206 to implement LHBM (e.g., LHBM 118) such that the UDFPS 302 can capture well-illuminated verify images (e.g., images of the fingerprint 114). In implementations, a high-luminance region (not illustrated) (e.g., high-luminance region 120) can also comprise any of a variety of two-dimensional shapes, including rectangles, ovals, or irregular shapes. In some implementations, the biometric authentication manager 214 can position the high-luminance region on the display 216 based on a location of user input at the display 216. For example, the display 216 can receive user input using a touch-sensitive layer (e.g., finger 112 on the cover layer 304) and the biometric authentication manager 214 can determine a location, size, and/or centroid of the user input. Based on the determination, the biometric authentication manager 214 implement LHBM 118 and instruct the processor(s) 206 to provide driving signals to the DDIC 220 to produce the high-luminance region. In another example, the computing device 202 can use proximity sensors, image-capturing sensors, touch-sensitive sensors, and/or radar sensors to determine a location of the user input before and/or during contact with the display 216.

Due to material rise-time delays, organic light-emitting diodes within the high-luminance region of the display 216 may gradually increase to a target luminance (e.g., a step response, a resistor-capacitor (RC) time constant response). For example, upon receiving user input, such as in the sensing region 306, the biometric authentication manager 214, executing on the one or more processors 206, may implement LHBM. Implementing LHBM may involve the one or more processors 206 instructing the DDIC 220 to produce the high-luminance region. Under conventional techniques, the high-luminance region gradually increases in luminosity to a target luminosity.

Figure 4:
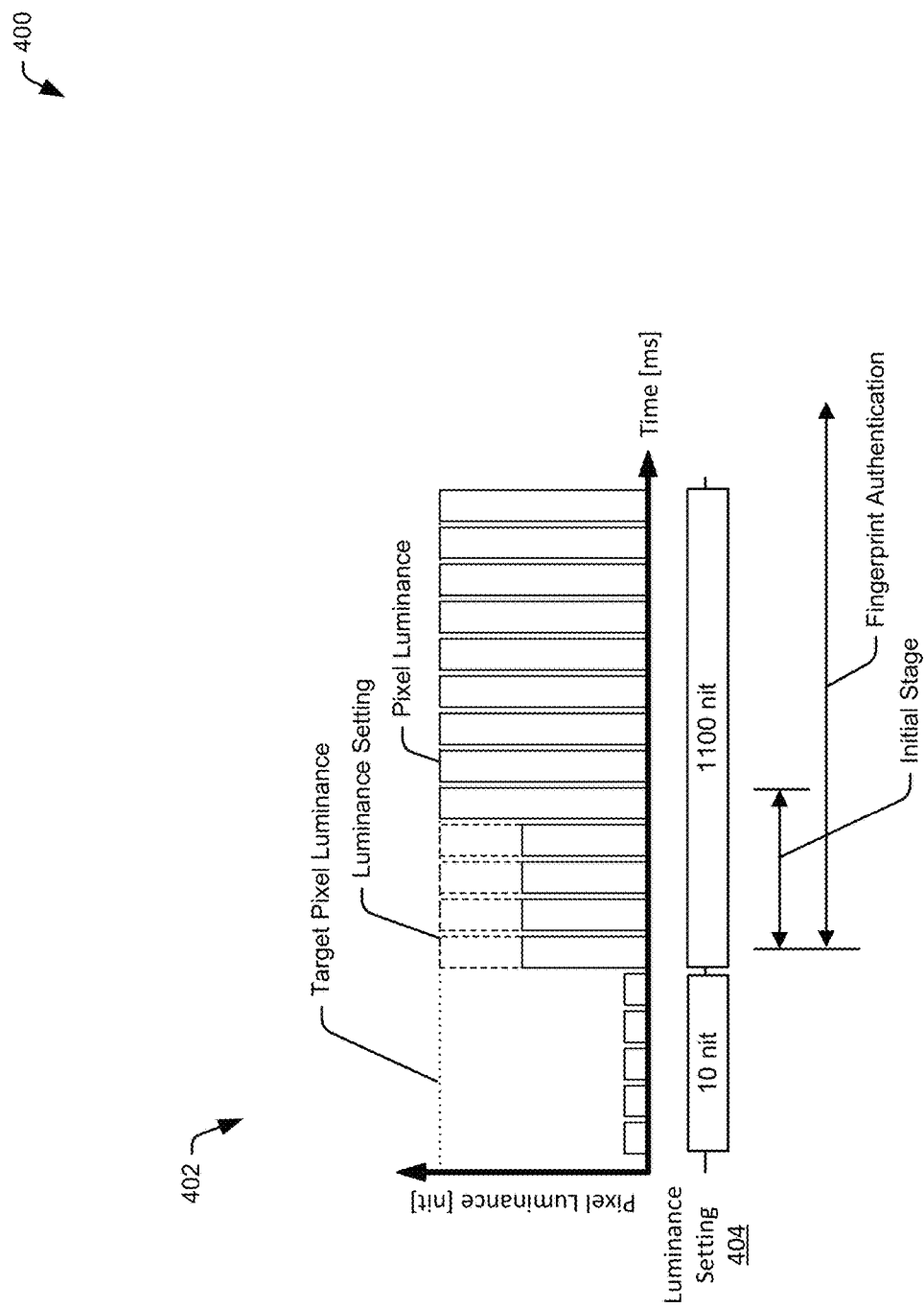
FIG. 4 illustrates an example graphical representation of display luminance latency in the high-luminance region during fingerprint authentication.

FIG. 4 illustrates an example graphical representation 400 of display luminance latency in the high-luminance region during fingerprint authentication. A pixel luminance versus time graph 402 illustrates the pixel luminance of the high-luminance region gradually increasing in luminosity during LHBM (e.g., for fingerprint authentication). FIG. 4 further illustrates a conventional timing of luminance settings 404.

As an example, prior to fingerprint authentication, the display 216 (not illustrated) emits light at a luminance of 10 nits. During fingerprint authentication, one or more processors 206 (not illustrated) may instruct the DDIC 220 (not illustrated) to implement LHBM. Using pre-coded settings, the DDIC 220 may set a target luminance for the high-luminance region at 1100 nit, for example. Thus, pixel circuits of the pixel array 218 (not illustrated) may receive data-line signals (e.g., voltage data) from a data-line driver operably coupled to the DDIC 220 to implement a luminance of 1100 nits. During an initial stage of LHBM, however, organic light-emitting diodes of the pixel circuits within the high-luminance region may emit light at a luminance of approximately 660 nits, despite receiving data-line signals targeting a pixel luminance of approximately 1100 nits. After the initial stage (e.g., 5-100 milliseconds), the organic light-emitting diodes within the high-luminance region may then emit light at a luminance of approximately 1100 nits. This latency in display luminance within the high-luminance region may delay fingerprint authentication since user input may be sub-optimally illuminated.

Although the increasing pixel luminance is illustrated in FIG. 4 as a single step, it should be noted that the gradual increase in luminosity may follow a parabolic curve (e.g., an RC time constant curve). For instance, during a first interval, the pixel luminance (e.g., average pixel luminance, peak pixel luminance) may be 60% of a target luminance. During a second interval, the pixel luminance may be 90% of a target luminance. It may take tens of milliseconds, in the conventional paradigm, before the UDFPS 302 can capture an image of a fingerprint that is usable by the biometric authentication system. For example, for a display operating at a 120 Hz refresh rate, it may take 10 ms before a finger is sufficiently illuminated. As another example, for a display operating at a 60 Hz refresh rate, it may take 20 ms before a finger is sufficiently illuminated.

Figure 5:
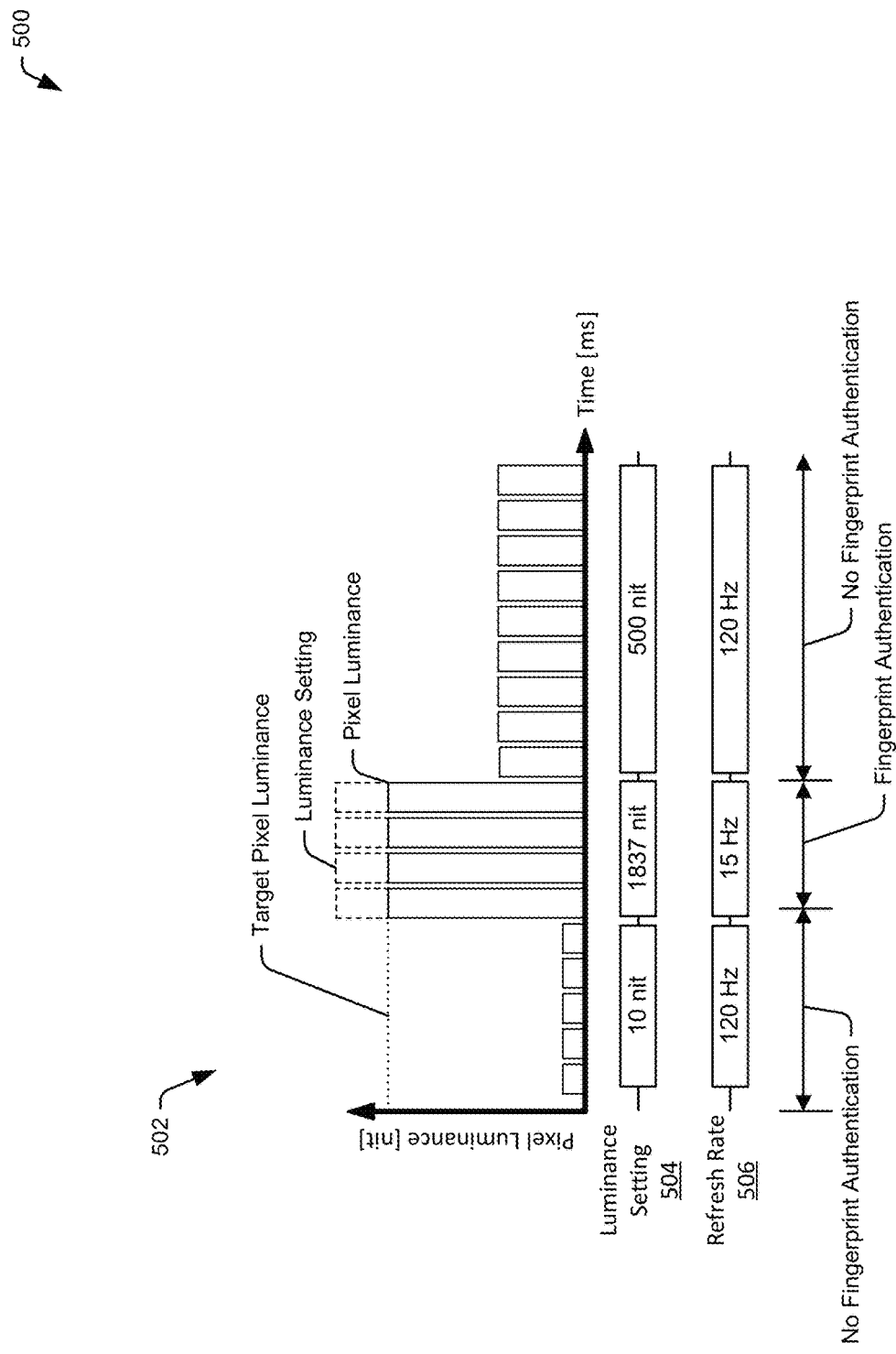
FIG. 5 illustrates a graphical representation of the biometric authentication manager compensating for display luminance latency in the high-luminance region during fingerprint authentication.

FIG. 5 illustrates a graphical representation 500 of the biometric authentication manager 214 compensating for display luminance latency in the high-luminance region during fingerprint authentication. A pixel luminance versus time graph 502 illustrates the pixel luminance of the high-luminance region during fingerprint authentication. FIG. 5 further illustrates a timing of luminance settings 504 and variable refresh rates 506.

In aspects, during fingerprint authentication, the biometric authentication manager 214 may compensate for display luminance latency by selectively adjusting the luminance setting in the high-luminance region for predetermined intervals. For example only and not by way of limitation, the biometric authentication manager 214 implements a luminance setting targeting 1.67 times a target pixel luminance pre-coded in the DDIC 220. As illustrated, the biometric authentication manager 214 programs a luminance setting of 1837 nits, which is 1.67 times a target pixel luminance of 1100 nits. The biometric authentication manager 214, executing on the one or more processors 206, also causes the display 216 to implement a refresh rate less than or equal to 15 Hz. As illustrated, the biometric authentication manager 214 programs a 15 Hz refresh rate during fingerprint authentication. In this way, the biometric authentication manager 214 causes the high-luminance region to emit at a brightness sufficient for UDFPS sensing (e.g., 1100 nits). Further, the illumination provided by the high-luminance region may be stable and consistent due to the 15 Hz refresh rate frequency extending for the duration of the UDFPS exposure time, facilitating UDFPS image capturing. In some implementations, the duration of the illumination may be greater than or equal to a UDFPS exposure time.

Figure 6:
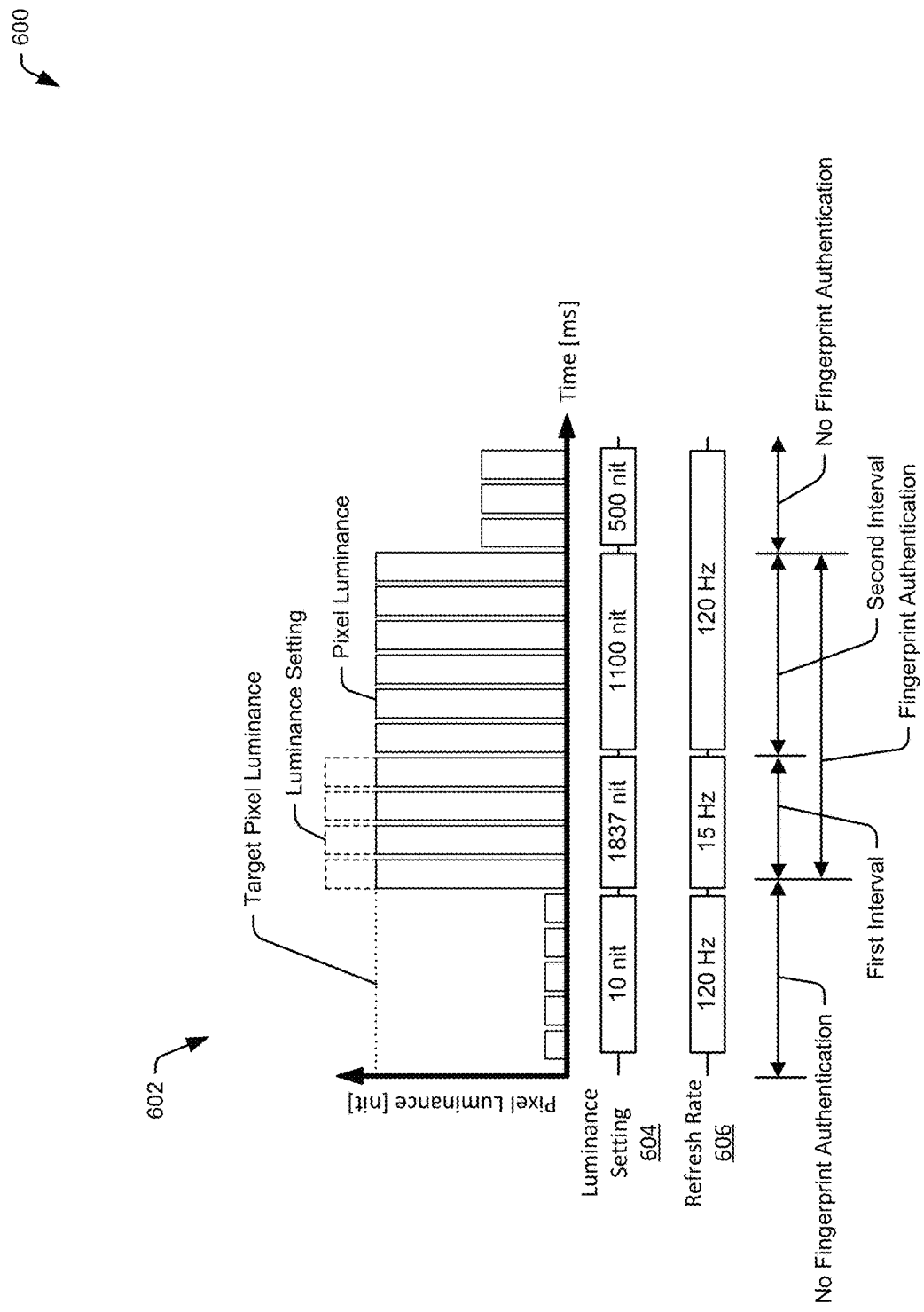
FIG. 6 illustrates another graphical representation of the biometric authentication manager compensating for display luminance latency in the high-luminance region during fingerprint authentication.

FIG. 6 illustrates another graphical representation 600 of the biometric authentication manager 214 compensating for display luminance latency in the high-luminance region during fingerprint authentication. A pixel luminance versus time graph 602 illustrates the pixel luminance of the high-luminance region during fingerprint authentication. FIG. 6 further illustrates a timing of luminance settings 604 and variable refresh rates 606.

In aspects, during fingerprint authentication, the biometric authentication manager 214 may compensate for display luminance latency by selectively adjusting the luminance setting in the high-luminance region for predetermined intervals. For example only and not by way of limitation, the biometric authentication manager 214 implements, for a first interval, a luminance setting targeting 1.67 times a target pixel luminance pre-coded in the DDIC 220. As illustrated, the biometric authentication manager 214 programs, for the first interval, a luminance setting of 1837 nits, which is 1.67 times a target pixel luminance of 1100 nits. The biometric authentication manager 214, executing on the one or more processors 206, also causes the display 216 to implement a refresh rate less than or equal to 15 Hz. As illustrated, the biometric authentication manager 214 programs a 15 Hz refresh rate during fingerprint authentication. In this way, the biometric authentication manager 214 causes the high-luminance region to emit at a brightness sufficient for UDFPS sensing (e.g., 1100 nits). As a result, the UDFPS 302 can capture a well-illuminated verify image with consistent and stable illumination for the first interval.

For a second interval during fingerprint authentication, the biometric authentication manager 214 may set a luminance setting sufficient to illuminate a finger for UDFPS sensing. In one example, the biometric authentication manager 214 lowers a luminance setting (in comparison to the first interval) to a pre-coded DDIC luminance setting for LHBM. As illustrated, for example, the biometric authentication manager 214 implements a luminance setting targeting a pixel luminance of 1100 nits. Further, during the second interval, the biometric authentication manager 214 may set the refresh rate for the display 216 above 15 Hz. As illustrated, for example, the biometric authentication manager 214 elevates the refresh rate frequency to 120 Hz (e.g., a previous refresh rate frequency).

Example Methods

Example method 700 is described with reference to FIGS. 5 and 6 in accordance with one or more aspects expediting fingerprint authentication via variable refresh rate control and display luminance compensation. This method is shown as sets of blocks that specify operations performed but are not necessarily limited to the order or combinations shown for performing the operations by the respective blocks. For example, any number of the described method blocks can be skipped or combined in any order to implement a method or an alternate method. In portions of the following discussion, reference may be made to entities or environments detailed in FIGS. 2 and 3 for example only. The techniques are not limited to performance by one entity or multiple entities operating on one device.

Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 7:
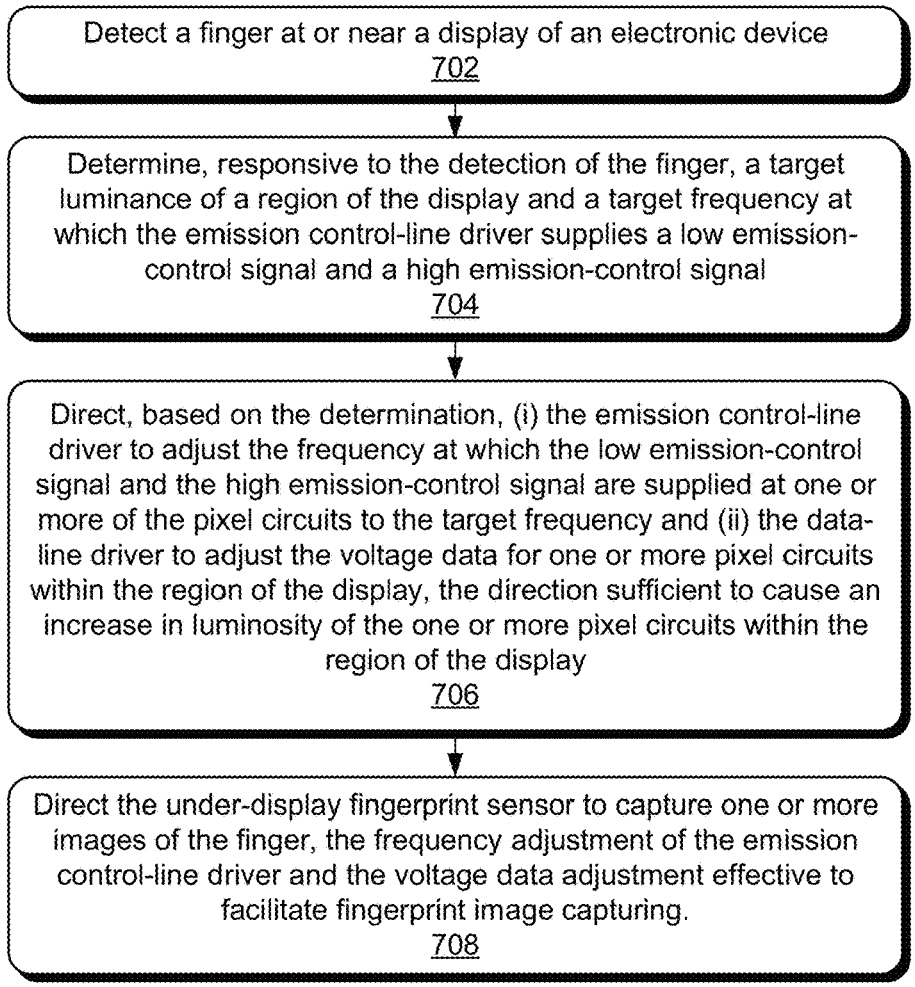
FIG. 7 illustrates an example method for expediting fingerprint authentication via variable refresh rate control and display luminance compensation in accordance with some implementations.

FIG. 7 illustrates an example method 700 for expediting fingerprint authentication via variable refresh rate control and display luminance compensation in accordance with some implementations. At block 702, a computing device (e.g., computing device 202) detects user input (e.g., a finger) at a display (e.g., display 216). For example, a biometric authentication manager (e.g., biometric authentication manager 214), executing on one or more processors (e.g., processors 206), detects user input or is activated upon the computing device receiving user input (e.g., within a fingerprint sensing region 306).

At block 704, the computing device determines, responsive to the detection of the finger, a target luminance of a region (e.g., a high-luminance region) of the display and a target frequency (e.g., refresh rate 506, refresh rate 606) at which an emission control-line driver (e.g., a row line driver 226) supplies a low emission-control signal and a high emission-control signal. In some implementations, the emission control-line driver implements a refresh rate for the display.

At block 706, the computing device directs, based on the determination, (i) the emission control-line driver to adjust the frequency at which the low emission-control signal and the high emission-control signal are supplied at one or more of the pixel circuits to the target frequency and (ii) the data-line driver to adjust the voltage data for one or more pixel circuits within the region of the display, the direction sufficient to cause an increase in luminosity of the one or more pixel circuits within the region of the display. In this way, the computing device causes the region to emit at a brightness sufficient for UDFPS sensing. Further, the illumination provided by the region may be stable and consistent due to setting the emission control-line driver to the target frequency, facilitating UDFPS image capturing. In some implementations, the duration of the illumination may be greater than or equal to a UDFPS exposure time.

At block 708, one or more processors of the computing device direct the UDFPS to capture one or more images of a finger with a sufficient exposure effective to facilitate fingerprint image capturing and expedite fingerprint authentication.

CONCLUSION

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying Drawings and terms discussed herein may be indicative of one or more items or terms, and thus reference may be made interchangeably to single or plural forms of the items and terms in this written description.

Although implementations for expediting fingerprint authentication via variable refresh rate control and display luminance compensation have been described in language specific to certain features and/or methods, the subject of the appended Claims is not necessarily limited to the specific features or methods described. Rather, the specific features and methods are disclosed as example implementations for expediting fingerprint authentication via variable refresh rate control and display luminance compensation.

What is claimed is:

1. A computing device comprising:
an under-display fingerprint sensor;
a display comprising:
   a pixel array including rows of pixel circuits, each of the pixel circuits comprising one or more light-emitting diodes;
   a data-line driver operably coupled to each of the pixel circuits, the data-line driver configured to selectively supply data-line signals to one or more of the pixel circuits, the data-line signals comprising voltage data effective to cause one or more pixel circuits to illuminate light at varying luminosities; and
   an emission control-line driver operably coupled to each of the pixel circuits, the emission control-line driver configured to:
     supply, in an alternating fashion, a low emission-control signal and a high emission-control signal to each of the pixel circuits effective to implement a refresh rate for the display; and
a processor configured to:
   detect at least one finger at or near the display of the computing device;
   determine, responsive to the detection of the at least one finger, a target luminance of a region of the display and a target frequency at which the emission control-line driver supplies the low emission-control signal and the high emission-control signal;

direct, based on the determination, (i) the emission control-line driver to adjust the frequency at which the low emission-control signal and the high emission-control signal are supplied at one or more of the pixel circuits to the target frequency and (ii) the data-line driver to adjust the voltage data for one or more pixel circuits within the region of the display, the direction sufficient to cause an increase in luminosity of the one or more pixel circuits within the region of the display; and instruct the under-display fingerprint sensor to capture one or more images of the at least one finger, the frequency adjustment of the emission control-line driver and the voltage data adjustment effective to facilitate fingerprint image capturing.

2. The computing device of claim 1, wherein the target frequency comprises a frequency less than or equal to 15 hertz.

3. The computing device of claim 1, wherein the direction to adjust the frequency and the voltage data occur during a first interval, the first interval lasting for at least a duration equal to an exposure time for the under-display fingerprint sensor.

4. The computing device of claim 3, wherein the processor is further configured to:

direct, in response the capture of one or more images, (i) the emission control-line driver to increase the frequency at which the low emission-control signal and the high emission-control signal are supplied at one or more of the pixel circuits to a second target frequency and (ii) the data-line driver to adjust the voltage data for one or more pixel circuits within the region of the display, the direction sufficient to maintain a luminosity of the one or more pixel circuits within the region of the display; and instruct the under-display fingerprint sensor to capture one or more additional images of the at least one finger.

5. The computing device of claim 4, wherein the direction to increase the frequency and adjust the voltage data occur during a second interval, the second interval lasting for at least a duration equal to an exposure time for the under-display fingerprint sensor.

6. The computing device of claim 3, wherein the direction to adjust the frequency and the voltage data comprises luminance settings targeting a lower pixel luminance than previous luminance settings during the first interval.

7. The computing device of claim 1, wherein the direction to adjust the frequency and the voltage data comprises luminance settings targeting a pixel luminance greater than 100% of a pre-coded pixel luminance setting in a display driver integrated circuit.

8. The computing device of claim 1, wherein the at least one finger is provided at the region of the display.

9. The computing device of claim 1, wherein the processor is further configured to:

authenticate, responsive to the capture of one or more images, a user based on analysis of a fingerprint of the at least one finger represented in the one or more images.

10. The computing device of claim 9, wherein the processor is further configured to:

provide, in accordance with a positive authentication of the user, access to one or more resources on the computing device.

11. The computing device of claim 1, wherein the display is a touch-sensitive display.

* * * * *